US011967178B2

(12) United States Patent
Zhong et al.

(10) Patent No.: US 11,967,178 B2
(45) Date of Patent: Apr. 23, 2024

(54) PROGRESSIVE TRANSFORMATION OF FACE INFORMATION

(71) Applicant: Microsoft Technology Licensing, LLC, Redmond, WA (US)

(72) Inventors: Yatao Zhong, Redmond, WA (US); Faezeh Amjadi, Redmond, WA (US); Ilya Dmitriyevich Zharkov, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 17/729,987

(22) Filed: Apr. 26, 2022

(65) Prior Publication Data

US 2023/0343136 A1 Oct. 26, 2023

(51) Int. Cl.

| | |
|---|---|
| *G06V 40/16* | (2022.01) |
| *G06T 3/00* | (2006.01) |
| *G06V 10/44* | (2022.01) |
| *G06V 10/82* | (2022.01) |
| *G06V 20/59* | (2022.01) |
| *H04N 21/4788* | (2011.01) |

(52) U.S. Cl.
CPC .......... *G06V 40/168* (2022.01); *G06T 3/0093* (2013.01); *G06V 10/454* (2022.01); *G06V 10/82* (2022.01); *G06V 20/597* (2022.01); *H04N 21/4788* (2013.01)

(58) Field of Classification Search
CPC .... G06V 40/168; G06V 10/454; G06V 10/82; G06V 20/597; G06T 3/0093; G06T 11/00; G06T 15/20; G06T 2219/2021; G06T 19/20; H04N 21/4788
See application file for complete search history.

(56) References Cited

U.S. PATENT DOCUMENTS

| | | | |
|---|---|---|---|
| 11,645,798 B1* | 5/2023 | Demyanov .......... | G06V 40/176 345/474 |
| 2022/0281317 A1* | 9/2022 | Ahn ....................... | G06V 20/59 |
| 2023/0019851 A1* | 1/2023 | Yi ........................ | G06N 3/0475 |

OTHER PUBLICATIONS

Blanz, et al., "A Morphable Model for The Synthesis of 3D Faces," in Proceedings of the 26th Annual Conference on Computer Graphics and Interactive Techniques, Jul. 1999, pp. 187-194.

(Continued)

*Primary Examiner* — Mekonnen D Dagnew

(57) ABSTRACT

A face-processing system is described for producing a target image based on a source image and driving information. The source image includes data depicting at least a face of a source subject having a source identity, a source pose, and a source expression. The driving information specifies one or more driving characteristics. The target image combines characteristics of the source image and the driving information. According to illustrative implementations, the face-processing system produces the target image by using plural warping subcomponents that operate at plural respective levels of a neural network and at increasing respective resolutions. Each warping subcomponent operates, in part, based on geometric displacement field (GDF) information that describes differences between a source mesh derived from the source image and a driving mesh derived from the driving information.

20 Claims, 8 Drawing Sheets

(56) References Cited

OTHER PUBLICATIONS

Booth, et al., "Large Scale 3D Morphable Models," in International Journal of Computer Vision, vol. 126, Issue 2-4, Apr. 2018, pp. 233-254.
Booth, et al., "3D Reconstruction of 'In-the-Wild' Faces in Images and Videos," in IEEE Transactions on Pattern Analysis and Machine Intelligence, vol. 40, No. 11, Nov. 2018, pp. 2638-2652.
Booth, et al., "A 3D Morphable Model Learnt from 10,000 Faces," open access version of paper in 2016 IEEE Conference on Computer Vision and Pattern Recognition (CVPR), 2016, 10 pages.
Cao, et al., "FaceWarehouse: A 3D Facial Expression Database for Visual Computing," in IEEE Transactions on Visualization and Computer Graphics, vol. 20, No. 3, Mar. 2014, pp. 413-425.
Chung, et al., "VoxCeleb2: Deep Speaker Recognition," in arXiv, Cornell University, arXiv:1806.05622v2 [cs.SD], Jun. 27, 2018, 6 pages.
Dale, et al., "Video Face Replacement.," in ACM Transactions on Graphics, vol. 30, Issue 6, Dec. 2011, 10 pages.
Deng, et al., "Arcface: Additive Angular Margin Loss for Deep Face Recognition," open access version of paper in 2019 IEEE/CVF Conference on Computer Vision and Pattern Recognition (CVPR), 2019, 10 pages.
Deng, et al., "Accurate 3D Face Reconstruction with Weakly-Supervised Learning: From Single Image to Image Set," open access version of paper in 2019 IEEE/CVF Conference on Computer Vision and Pattern Recognition Workshops (CVPRW), 2019, 11 pages.
Doukas, et al., "HeadGAN: One-shot Neural Head Synthesis and Editing," open access version of paper in Proceedings of the IEEE/CVF International Conference on Computer Vision, Oct. 2021, 10 pages.
Feng, et al., "Learning an Animatable Detailed 3D Face Model from In-The-Wild Images," in ACM Transactions on Graphics, vol. 40, Issue 4, Article No. 88, Aug. 2021, 13 pages.
Gafni, et al., "Dynamic Neural Radiance Fields for Monocular 4D Facial Avatar Reconstruction," open access version of paper in 2021 IEEE/CVF Conference on Computer Vision and Pattern Recognition (CVPR), Jun. 2021, 10 pages.
Gao, et al., "Portrait Neural Radiance Fields from a Single Image," in arXiv, Cornell University, arXiv:2012.05903v2 [cs.CV], Apr. 16, 2021, 11 pages.
Garrido, et al., "Automatic Face Reenactment," open access version of paper in 2014 IEEE Conference on Computer Vision and Pattern Recognition, 2014, 8 pages.
Geng, et al., "Warp-Guided GANs for Single-Photo Facial Animation," in ACM Transactions on Graphics, vol. 37, Issue 6, Article No. 231, Nov. 2018, 12 pages.
Ha, et al., "MarioNETte: Few-Shot Face Reenactment Preserving Identity of Unseen Targets," in Proceedings of the Thirty-Fourth AAAI Conference on Artificial Intelligence (AAAI-20), vol. 34, 2000, pp. 10893-10900.
Heusel, et al., "GANs Trained by a Two Time-Scale Update Rule Converge to a Local Nash Equilibrium," in NIPS'17: Proceedings of the 31st International Conference on Neural Information Processing Systems, 2017, 12 pages.
Huang, et al., "Arbitrary Style Transfer in Real-time with Adaptive Instance Normalization," open access version of paper in 2017 IEEE International Conference on Computer Vision (ICCV), 2017, 10 pages.
Isola, et al., "Image-to-Image Translation with Conditional Adversarial Networks," open access version of paper in 2017 IEEE Conference on Computer Vision and Pattern Recognition (CVPR), 2017, 10 pages.
Johnson, et al., "Perceptual Losses for Real-Time Style Transfer and Super-Resolution," in arXiv, Cornell University, arXiv:1603.08155v1 [cs.CV], Mar. 27, 2016, 18 pages.
Kim, et al., "Deep Video Portraits," in ACM Transactions on Graphics, vol. 37, Issue 4, Article 163, Aug. 2018, 14 pages.
Koujan, et al., "Head2Head: Video-based Neural Head Synthesis," in arXiv, Cornell University, arXiv:2005.10954v1 [cs.CV], May 22, 2020, 8 pages.
Li, et al, "Learning a model of facial shape and expression from 4d scans," in ACM Transactions on Graphics, vol. 36, Issue 6, Article No. 194, Nov. 2017, 17 pages.
Lim, et al., "Geometric GAN," in arXiv, Cornell University, arXiv:1705.02894v2 [stat.ML], May 9, 2017, 17 pages.
Loper, et al., "SMPL: A Skinned Multi-Person Linear Model," in ACM Transactions on Graphics, vol. 34, Issue 6, Article No. 248, Nov. 2015, 16 pages.
Mildenhall, "NeRF: Representing Scenes as Neural Radiance Fields for View Synthesis," in arXiv, Cornell University, arXiv:2003.08934v2 [cs.CV], Aug. 3, 2020, 25 pages.
Miyato, et al., "Spectral Normalization for Generative Adversarial Networks," in arXiv, Cornell University, arXiv:1802.05957v1 [cs.LG], Feb. 16, 2018, 26 pages.
Nagrani, et al., "Voxceleb: a large-scale speaker identification dataset," in arXiv, Cornell University, arXiv:1706.08612v2 [cs.SD], May 30, 2018, 6 pages.
Park, et al., "Semantic Image Synthesis with Spatially-Adaptive Normalization," open access version of paper in 2019 EEE/CVF Conference on Computer Vision and Pattern Recognition (CVPR), 2019, 10 pages.
Paysan, et al., "A 3D Face Model for Pose and Illumination Invariant Face Recognition," in 2009 Sixth IEEE International Conference on Advanced Video and Signal Based Surveillance, 2009, 6 pages.
Raj, et al., "Pixel-aligned Volumetric Avatars," in arXiv, Cornell University, arXiv:2101.02697v1 [cs.CV], Jan. 7, 2021, 10 pages.
Ren, et al., "PIRenderer: Controllable Portrait Image Generation via Semantic Neural Rendering," open access version of paper in 2021 IEEE/CVF International Conference on Computer Vision (ICCV), Oct. 2021, 10 pages.
Ronneberger, et al., "U-Net: Convolutional Networks for Biomedical Image Segmentation," in arXiv, Cornell University, arXiv:1505.04597v1 [cs.CV], May 18, 2015, 8 pages.
Siarohin, et al., "Animating Arbitrary Objects via Deep Motion Transfer," open access version of paper in 2019 IEEE/CVF Conference on Computer Vision and Pattern Recognition (CVPR), 2019, 10 pages.
Siarohin, et al., "First Order Motion Model for Image Animation," in 33rd Conference on Neural Information Processing Systems (NeurIPS 2019), 2019, 11 pages.
Simonyan, et al., "Very Deep Convolutional Networks for Large-Scale Image Recognition," in arXiv, Cornell University, arXiv:1409.1556v6 [cs.CV], Apr. 10, 2015, 14 pages.
Theis, et al., "Face2Face: Real-time Face Capture and Reenactment of RGB Videos," in arXiv, Cornell University, arXiv:2007.14808v1 [cs.CV], Jul. 29, 2020, 12 pages.
Theis, et al., "HeadOn: Real-time Reenactment of Human Portrait Videos," in ACM Transactions on Graphics, vol. 37, Issue 4, Article No. 164, Aug. 2018, 13 pages.
Wang, et al., "Few-shot Video-to-Video Synthesis," in arXiv, Cornell University, arXiv:1910.12713v1 [cs.CV], Oct. 28, 2019, 14 pages.
Wang, et al., "Video-to-Video Synthesis," in arXiv, Cornell University, arXiv:1808.06601v2 [cs.CV], Dec. 3, 2018, 14 pages.
Zhong, et al., "Geometry Driven Progressive Warping for One-Shot Face Animation," arXiv, arXiv:2210.02391v1 [cs. CV], Oct. 5, 2022, 21 pages.
"One-Shot Free-View Neural Talking Head Synthesis," available at https://github.com/zhanglonghao1992/One-Shot_Free-View_Neural_Talking_Head_Synthesis, One-Shot Free-View Neural Talking Head Synthesis, GitHub, accessed on Dec. 18, 2022, 3 pages.
Meshry, et al., "Learned Spatial Representations for Few-shot Talking-Head Synthesis," open access version of paper in 2021 IEEE/CVF International Conference on Computer Vision (ICCV), Oct. 2021, 10 pages.
Szegedy, et al., "Rethinking the Inception Architecture for Computer Vision," open access version of paper in 2016 IEEE Conference on Computer Vision and Pattern Recognition (CVPR), 2016, 9 pages.
"Face Alignment," available at https://github.com/1adrianb/face-alignment, Github, accessed on Dec. 18, 2022, 6 pages.

(56) References Cited

OTHER PUBLICATIONS

Zhong, et al., "Geometry Driven Progressive Warping for One-Shot Face Animation," in The 33rd British Machine Vision Conference Proceedings, Nov. 2022, 14 pages.
Wang, et al., "One-Shot Free-View Neural Talking-Head Synthesis for Video Conferencing," in arXiv, Cornell University, arXiv:2011.15126v3 [cs.CV], Apr. 2, 2021, 16 pages.
Wiles, et al., "X2face: A network for controlling face generation using images, audio, and pose codes," in arXiv, Cornell University, arXiv:1807.10550v1 [cs.CV], Jul. 27, 2018, 24 pages.
Yi, et al., "Audio-driven Talking Face Video Generation with Learning-based Personalized Head Pose," in arXiv, Cornell University, arXiv:2002.10137v2 [cs.CV], Mar. 5, 2020, 12 pages.
Zakharov, et al., "Fast Bi-layer Neural Synthesis of One-Shot Realistic Head Avatars," in ECCV 2020: 16th European Conference, Aug. 2020, 17 pages.
Zakharov, et al., "Few-Shot Adversarial Learning of Realistic Neural Talking Head Models," in arXiv, Cornell University, arXiv:1905.08233v2 [cs.CV], Sep. 25, 2019, 21 pages.
Zhang, et al., "Flow-guided One-shot Talking Face Generation with a High-resolution Audio-visual Dataset," open access version of paper in 2021 IEEE/CVF Conference on Computer Vision and Pattern Recognition (CVPR), Jun. 2021, 10 pages.
Nandwal, Ritik, "3D Face and Body Reconstruction," available at https://medium.com/offnote-labs/3d-face-and-body-reconstruction-95f59ada1040, Medium, Sep. 20, 2021, 19 pages.
"GLSL Tutorial—Rasterization and Interpolation," available at http://www.lighthouse3d.com/tutorials/glsl-tutorial/rasterization-and-interpolation/, Lighthouse3D, accessed on Mar. 31, 2022, 5 pages.
"Hinge loss," available at https://en.wikipedia.org/wiki/Hinge_loss, Wikipedia article, accessed on Mar. 30, 2022, 3 pages.
He, et al., "Deep Residual Learning for Image Recognition," in arXiv, Cornell University, arXiv:1512.03385v1 [cs.CV], Dec. 10, 2015, 12 pages.
Roy, et al., "Multi-scale Attention Guided Pose Transfer," arXiv, Cornell University, arXiv:2202.06777v1 [cs.CV], Feb. 14, 2022, 14 pages.
Park et al., "Semantic Image Synthesis with Spatially-Adaptive Normalization," arXiv, Cornell University, arXiv:1903.07291v1 [cs.CV], Mar. 18, 2019, 19 pages.
Search Report and Written Opinion for PCT/US2023/012474, dated May 2023, 13 pages.

* cited by examiner

ILLUSTRATIVE OPERATION OF THE FACE-PROCESSING SYSTEM 102
1002

RECEIVE A SOURCE IMAGE THAT INCLUDES DATA DEPICTING AT LEAST A FACE OF A SOURCE SUBJECT HAVING A SOURCE IDENTITY, A SOURCE POSE, AND A SOURCE EXPRESSION.
1004

RECEIVE DRIVING INFORMATION THAT SPECIFIES ONE OR MORE DRIVING CHARACTERISTICS.
1006

PRODUCE A TARGET IMAGE THAT COMBINES CHARACTERISTICS OF THE SOURCE IMAGE AND THE DRIVING INFORMATION, THE TARGET IMAGE BEING PRODUCED BY PERFORMING PLURAL INSTANCES OF WARPING ANALYSIS AT PLURAL RESPECTIVE LEVELS OF A NEURAL NETWORK, THE PLURAL INSTANCES OF WARPING ANALYSIS OPERATING AT INCREASING RESPECTIVE RESOLUTIONS, ONE OF THE PLURAL INSTANCES, CORRESPONDING TO A CURRENT INSTANCE OF WARPING ANALYSIS, OPERATING AT A CURRENT-LEVEL RESOLUTION, AND HAVING A PRECEDING INSTANCE OF WARPING ANALYSIS THAT OPERATES AT A PRIOR-LEVEL RESOLUTION THAT IS LESS THAT THE CURRENT-LEVEL RESOLUTION.
1008

FIG. 10

ILLUSTRATIVE OPERATION OF THE AN ILLUSTRATIVE WARPING SUBCOMPONENT 302
1102

RECEIVE GEOMETRIC DISPLACEMENT FIELD (GDF) INFORMATION THAT DESCRIBES DIFFERENCES BETWEEN A SOURCE MESH GENERATED BASED ON THE SOURCE IMAGE AND A DRIVING MESH GENERATED BASED ON THE DRIVING INFORMATION.
1104

RECEIVE CURRENT-LEVEL SOURCE FEATURE INFORMATION PRODUCED BASED ON THE SOURCE IMAGE, AT THE CURRENT-LEVEL RESOLUTION.
1106

RECEIVE PRIOR-LEVEL REALIGNED FEATURE INFORMATION THAT HAS BEEN PRODUCED BY THE PRECEDING INSTANCE OF WARPING ANALYSIS, AT THE PRIOR-LEVEL RESOLUTION.
1108

MAP THE GDF INFORMATION, CURRENT-LEVEL SOURCE FEATURE INFORMATION, AND PRIOR-LEVEL REALIGNED FEATURE INFORMATION TO CURRENT-LEVEL REALIGNED FEATURE INFORMATION, AT THE CURRENT-LEVEL RESOLUTION.
1110

FIG. 11

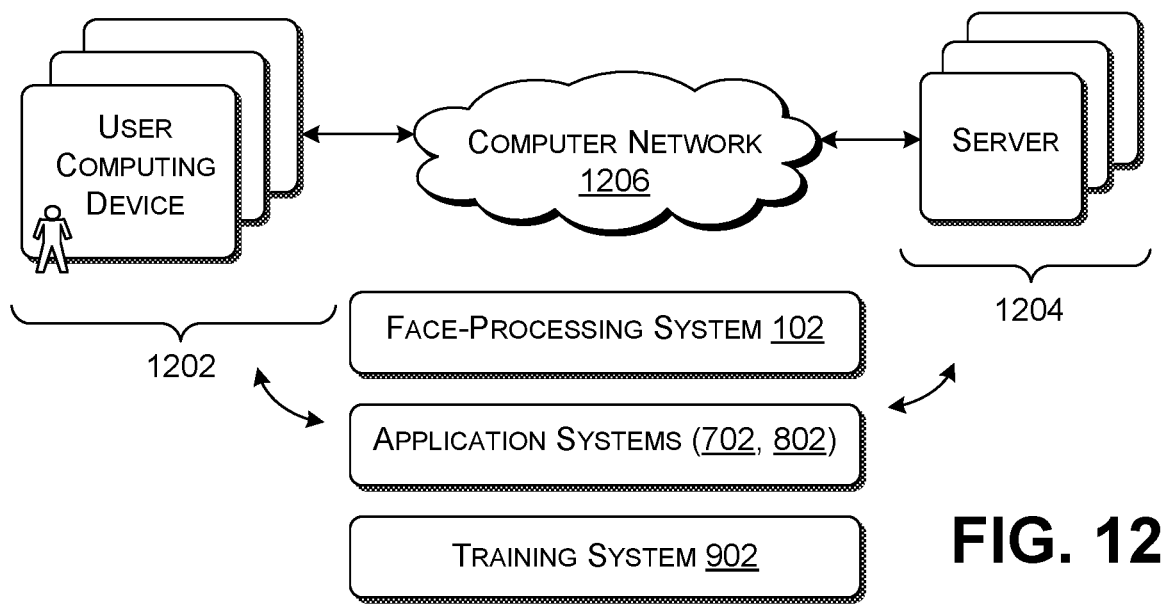

FIG. 12

PROGRESSIVE TRANSFORMATION OF FACE INFORMATION

BACKGROUND

The technical literature describes neural networks that are capable of synthesizing images based on information obtained from two or more sources. A face animation system uses this technology to actively manipulate poses and expressions in synthesized images. While these image-processing systems have produced impressive results, there is room for improvement in this field of technology. For instance, known image-processing systems may exhibit spatial alignment-related problems and other artifacts that may impair the quality of the synthesized images. In addition, these systems may use complex neural network architectures that may prevent these systems from being successfully deployed on resource-constrained computing platforms.

SUMMARY

A face-processing system is described for synthesizing a target image based on a source image and driving information. The source image includes data depicting at least a face of a source subject having a source identity, a source pose, and a source expression. The driving information specifies one or more driving characteristics. The target image combines characteristics of the source image and the driving information. According to illustrative implementations, the face-processing system produces the target image by using plural warping subcomponents that operate at plural respective levels of a neural network and at increasing respective resolutions.

In some cases, the driving information describes a driving pose and/or a driving expression of a driving subject. The face-processing system can produce a target image that shows the face of the source subject having the source identity, but which exhibits the driving pose and/or the driving expression. The driving subject may be the same as or different from the source subject.

In some cases, the driving information is obtained from a driving image. The driving image shows a face having the same identity as the source image or a different identity. In other cases, the driving information is directly specified in non-image form, e.g., in the form of driving parameter information Consider the illustrative operation of one of the warping subcomponents at a particular level L+1, referred to below as the "current warping subcomponent" at a "current level." The current warping subcomponent operates at a current-level resolution, and has a preceding warping subcomponent that operates at a prior-level resolution that is less than the current-level resolution. The current warping subcomponent operates by receiving: (a) geometric displacement field (GDF) information that describes differences between a source mesh that is generated based on the source image and a driving mesh that is generated based on the driving information; (b) current-level source feature information $F_s^{(L+1)}$ produced based on the source image; and (c) prior-level realigned feature information $F_r^{(L)}$ that has been produced by the preceding warping subcomponent. In response, the current warping subcomponent maps the GDF information, current-level source feature information $F_s^{(L+1)}$ and prior-level realigned feature information $F_r^{(L)}$ to current-level realigned feature information $F_r^{(L+1)}$.

One illustrative application system uses the face-processing system to modify video frames captured by a video camera. The video frames show a participant of a video conferencing session. The face-processing system uses each video frame as a driving image, that, when combined with a source image, produces a target image. The target image preserves aspects of the source image, but is otherwise driven by the video frame. The application system sends the target image to another participant of the video conferencing session in lieu of the original video frame captured by the video camera. A participant may choose to use the application system to mask aspects of his or her appearance, behavior, etc. that he or she does not wish to share with others participants, while otherwise actively engaging the other participants in a photorealistic manner via synthesized images.

Among its technical merits, the face-processing system described herein produces more photorealistic image results compared to some other image-processing systems, and reduces the occurrence of artifacts in the image results. More specifically, the face-processing system generates more accurate displacement information compared to some other image-processing systems, and also learns to correctly extend the displacement information to peripheral non-face regions. Further, the face-processing system is compact, which enables the face-processing system to run on resource-constrained computing platforms.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 is a flowchart that presents an overview of one illustrative manner of operation of the face-processing system of FIG. 1.

FIG. 11 is a flowchart that presents an overview of one illustrative manner of operation of the warping subcomponent of FIG. 3.

FIG. 12 shows computing equipment that can be used to implement the face-generating system of FIG. 1, the application systems of FIGS. 7 and 8, and the training system of FIG. 9.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Subsection A.1 of Section A provides an overview of a face-processing system for synthesizing a target image. Subsection A.2 describes various application systems that make use of the face-processing system. Subsection A.3 describes a training system that trains a model underlying the operation of the face-processing system. Section B sets forth illustrative methods that explain the operation of the systems of Section A. And Section C describes illustrative computing functionality that can be used to implement any aspect of the features described in Sections A and B.

A. Illustrative Systems

A.1. Overview

Figure 1:
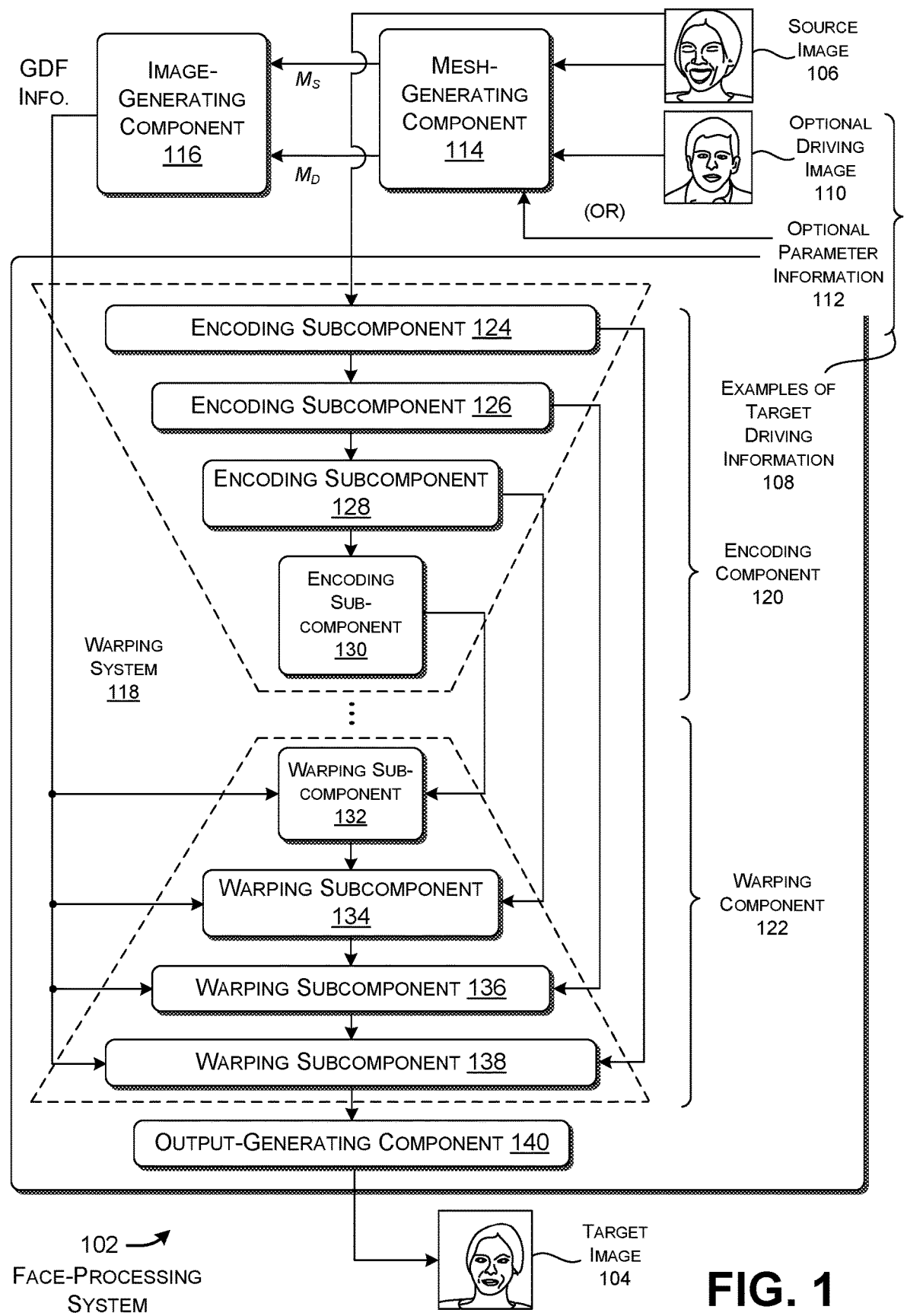
FIG. 1 shows an illustrative face-processing system for synthesizing a target image based on a source image and driving information.

FIG. 1 shows a face-processing system 102 for synthesizing a target image 104 based on at least a source image 106 and driving information 108. The source image 106 includes data showing a face of a source subject. The target image 104 includes data that shows the face of a target subject. In some examples, the source subject and the target subject are the same person. In other examples, the source subject and the target subject are different people. Further note that this disclosure emphasizes those cases in which the "subjects" are human beings. But implementations of the face-processing system 102 can expand the definition of "subjects" to include fictional characters, such as avatars. For instance, the source image 106 can correspond to a human-drawn or computer-generated face of a fictional character.

The source image 106 is characterized by a source identity, a source pose, and a source expression. The source identity specifies the shape of a face depicted in the source image 106, and therefore may loosely be said to specify the identity of the person in the source image 106. The source pose identifies the spatial orientation of the source subject with respect to different bases of movement. For instance, the subject may strike a pose by moving his or her head, eyes, jaw, etc. The source expression identifies the expression on the source subject's face. The subject may exhibit an expression through various facial contortions, such as frowning, squinting his or her eyes, scrunching his or her nose, furrowing his or her brow, etc.

The driving information 108 specifies at least a driving pose and/or a driving expression of a driving subject. The driving pose identifies the relative positioning of the driving subject with respect to the predefined bases of movement. The driving expression identifies the expression of the driving subject's face. In some scenarios, the face-processing system 102 receives the driving information 108 in the form of a driving image 110 that shows the face of the driving subject. In other scenarios, the face-processing system 102 receives the driving information 108 in the form of driving parameter information 112. The driving parameter information 112 specifies the driving pose and/or the driving expression though some means other than a target image. For example, the driving parameter information 112 can specify one or more parameter values that specify the driving pose and/or one or more parameter values that specific the driving expression.

In some cases, the target image 104 depicts a face of a subject that preserves the source identity, yet which adopts either the target expression or the target pose, and/or which adopts both the target expression and the target pose. For instance, the source image 106 may show a smiling source subject, while the driving expression may correspond to a frown. Hence, the target image 104 will show a frowning source subject. In other application scenarios, the user may use the driving information 108 to also modify some aspect of the shape (e.g., identity) of the source image 106.

The face-processing system 102 includes a meshing-generating component 114, an image-generating component 116, and a warping system 118. The mesh-generating component 114 produces a source mesh $M_S$ based on the source image 106, and a driving mesh $M_D$ based on the driving information 108. The source mesh $M_S$ provides a set of vertices that describe a triangulated three-dimensional shape, constructed on the basis of the source image 106. The driving mesh $M_D$ describes a set of vertices that describe another triangulated three-dimensional shape, constructed on the basis of the driving information 108. As will be described below, the mesh-generating component 114 produces a mesh by converting input information into a set of model parameters. The mesh-generating component 114 then uses a face model to convert the model parameters into a mesh.

In some implementations, each mesh is represented by a first N×3 matrix that describes N vertices in the mesh, and a second M×3 matrix that describes M triangles in the mesh. That is, each entry of the first matrix specifies the x, y, and z coordinates of a corresponding vertex in the mesh. Each entry of the second matrix specifies the three vertices of a corresponding triangle in the mesh. The second matrix can specify a vertex by identifying the index value of the first matrix at which the details regarding the vertex are stored.

The image-generating component 116 generates difference information that describes the vertex-wise differences between the source mesh $M_S$ and the driving mesh $M_D$. That is, the difference information includes difference vectors expressed as $V_{D \to S} = M_S - M_D$. The image-generating component 116 then renders the displacement vectors to output information, referred to herein as geometric displacement field (GDF) information. The GDF information is characterized as "geometric" because it originates from two three-dimensional meshes produced by a geometric face model. The image-generating component 116 can perform rendering using a standard graphics pipeline, including backface culling and rasterization. Backface culling uses known techniques to remove triangles that are not visible from a viewing direction. Rasterization uses known techniques to convert triangulated three-dimensional information into a set of pixels for display or further processing.

The warping system 118 uses the GDF information as a modulation signal to resample features from the source image 106 and place them in target image coordinates. The warping system 118 includes a pipeline that includes an encoder component 120 and a warping component 122. The encoding component 120 includes plural encoding subcomponents (e.g., 124, 126, 128, 130, etc.) that perform respective convolution operations at successively smaller resolutions. The warping component 122 includes plural sub-warping components (e.g., 132, 134, 136, 138, etc.) that perform warping operations at successively larger resolutions. Each encoding subcomponent provides output information that serves as input information to a next encoding subcomponent (if any) in the pipeline. Each warping subcomponent likewise provides output information that serves as input information to a next warping subcomponent (if any) in the pipeline. Each warping subcomponent also receives input information generated by a counterpart encoding subcomponent that operates at the same resolution level. For example, the last warping subcomponent 138 receives input information from the first encoding subcomponent 124.

More specifically, each encoding subcomponent performs a convolution operation that involves moving a n×m kernel (e.g., a 3×3 kernel) across an input image (where "input image" in this general context refers to whatever image is fed to the encoding subcomponent). In one case, at each position of the kernel, the encoding subcomponent generates the dot product of the kernel values with the underlying pixel values of the image. The encoding subcomponent stores that dot product as an output value in an output image at a position corresponding to the current location of the kernel. In some implementations, each encoding subcomponent performs the convolution operation using a stride of 2. The stride defines the increment over which the kernel is advanced over the input image. By virtue of this stride selection, each encoding subcomponent effectively down-samples its input image to a smaller size. For example, the first encoding subcomponent 124 converts the input source image 106 having a non-limiting size of 256×256 to an output image of size 128×128.

Each warping subcomponent that operates at a particular level L+1 uses the GDF information to modulate realigned feature information $F_r^{(L)}$ generated by a preceding warping subcomponent (if any) that operates at level L. This yields full displacement field information. A warping engine uses the full displacement field information to realign pixels from source feature information $F_s^{(L+1)}$ generated by the counterpart encoding subcomponent for level L+1 to the target image space, to produce realigned feature information $F_r^{(L+1)}$.

An optional output-generating component 140 maps realigned feature information produced by the last warping component 138 into the target image 104. The output-generating component 140 can perform this task using a convolution operation, e.g., using a 3×3 kernel and stride of 1.

By virtue of performing warping at cascading level of increasing resolution, the warping system 118 can produce more accurate displacement information compared to other face image-processing systems that rely on a single warping operation. That is, the displacement information more accurately describes the connection between the pixels of source image and the target space compared to other face image-processing systems. Further, each warping subcomponent uses the realigned feature information $F_r^{(L)}$ as context information, which, when combined with the GDF information, allows the warping subcomponent to successfully extend face displacement information to peripheral non-face regions, such as hair, hats, collars, etc. These advantages result in the production of a target image that contains fewer artifacts compared to other face image-processing systems.

Further, the warping system 118 uses a unified encoder-warping architecture to perform all aspects of its warping analysis. This makes the warping system 118 more compact than other face image-processing systems that rely on a cascaded pipeline of distinct subsystems that perform different aspects of a face synthesizing operation (e.g., feature extraction, displacement estimation, image generation, image refinement, etc.). This characteristic, in turn, enables the warping system 118 to run on resource-constrained platforms with limited memory and processing resources.

Although not shown, an application system can apply the face-processing system 102 shown in FIG. 1 to process individual frames of video information. Subsection A.2 describes different illustrative uses of the face-processing system 102.

Figure 2:
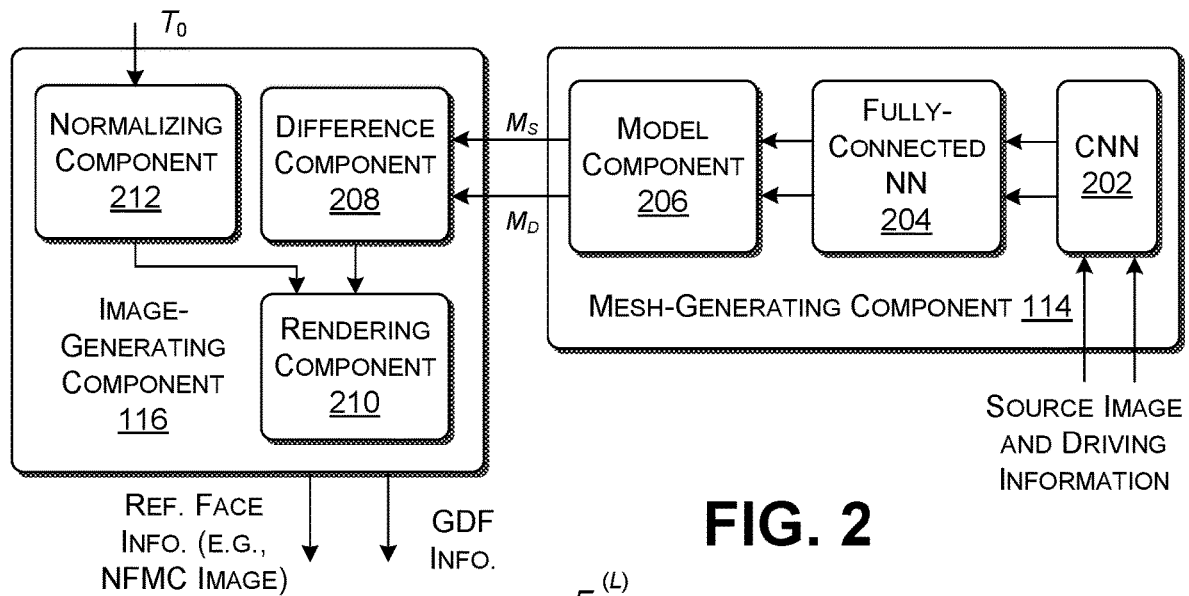
FIG. 2 shows a mesh-generating component and an image-generating component, which are parts of the face-processing system of FIG. 1.

Advancing to FIG. 2, this figure shows one implementation of the mesh-generating component 114 and the image-generating component 116. The mesh-generating component 114 transforms the source image 106 into the source mesh $M_S$, and transforms the driving information 108 into the driving mesh $M_D$. To repeat, in some instances the driving information 108 corresponds to the driving image 110, while in other instances the driving information 108 corresponds to driving parameter information 112. The mesh-generating component 114 can perform these two transformations in series or in parallel.

The mesh-generating component 114 includes a convolutional neural network (CNN) 202 having any number of layers. Among other possible components, a convolutional neural network includes a series of convolutional layers, optionally interspersed with pooling layers, and optionally including residual connections. A pooling layer down-samples results of a preceding convolutional operation using some sampling function, such as a maximum operation that selects a maximum value within a subset of values. A residual connection adds input information fed to a function (such as one or more convolution operations) to output information generated by the function. The output of the CNN 202 is followed by a fully-connected neural network 204 having any number of layers and using any type(s) of activation function(s).

The output of the fully-connected neural network 204 is a first set of model parameters that characterize the source image 106, and a second set of model parameters that characterize the driving information 108. Each set of model parameters, in turn, includes a subset of shape parameters (β), a subset of pose parameters (θ), and a subset of expression parameters (ψ). For the case of the source image 106, the shape parameters describe the shape (and hence identity) of the subject depicted in the source image 106. The pose parameters describe the pose of the subject depicted in the source image 106. The expression parameters describe the expression of the subject depicted in the source image 106. Counterpart model parameters are calculated based on shape, pose, and expression information conveyed by the driving information 108.

A machine-trained face model component 206 maps each set of model parameters to a mesh, e.g., by mapping the source model parameters to the source mesh $M_S$, and mapping the driving model parameters to the driving mesh $M_D$. The face-processing system 102 can use any type face model to perform this task. In one non-limiting case, the face-processing system 102 uses the FLAME model available from the Max Planck Society for the Advancement of Science (Max-Planck-Gesellschaft zur Förderung der Wissenschaften e.V.) of Munich Germany, which is described in Li, et al., "Learning a Model of Facial Shape and Expression from 4D Scans," in ACM Transactions on Graphics, Vol. 36, Issue 6, Article No. 194, December 2017, 17 pages, and Feng, et al., "Learning an Animatable Detailed 3D Face Model from In-The-Wild Images," in ACM Transactions on Graphics, Vol. 40, Issue 4, Article No. 88, August 2021, 13 pages.

The FLAME model uses Equation (1) to performs a linear blending skinning function (LBS) by rotating a set of vertices T around a set of shape-dependent joints $J(\beta)$, as modified by linear blending weights W.

$$M(\beta, \theta, \psi) = LBS(T_P(\beta, \theta, \psi), J(\beta), \theta, W), \text{ where} \quad (1)$$

$$T_P(\beta, \theta, \psi) = T_0 + \sum_{n=1}^{|\beta|} \beta_n S_n + \sum_{n=1}^{|\psi|} \psi_n E_n + \sum_{n=1}^{9K} (R_n(\theta) - R_n(\theta_0))P_n. \quad (2)$$

The set of vertices T is defined with respect to a mean face template $T_P(\beta,\theta,\psi)$. As indicated in Equation (2), $T_P$ depends on a face template $T_0$ in a reference "zero pose" $\theta_0$. This reference template is modified by corrective shape, expression, and pose blend shape functions. That is, S and E respectively describe orthogonal shape and expression bases, which are obtained from principal component analysis (PCA). Each $S_n$ in S is modified by a corresponding machined trained coefficient $\beta_n$, and each $E_n$ in E is modified by a machine-trained coefficient $\psi_n$. $R(\theta)$ is a function to convert a pose $\theta$ to rotation matrices of joints. P is a matrix that includes all pose blend shapes, each of which is denoted by $P_n$. The pose specifically describes rotation about K predetermined joints, including joints that permit articulated movement of a subject's jaw, neck, and eyeballs. The shape, pose, and expression blend shapes are disentangled, meaning that they can be manipulated in an independent manner. The LBS function itself is standard and involves computing the vertices of a three-dimensional shape as a weighted linear combination of the components (e.g., bones) of an underlying skeletal structure.

Other face models can vary from the FLAME model in various respects. For example, other face models can characterize the shape and movement of a user's face using other joint definitions compared to the specific K joints used by the FLAME model. Further, other face models can define the mean face template using other functions compared to the FLAME model.

Now referring to the image-generating component 116, a difference component 208 performs a vertex-wise difference between the source mesh $M_S$ and the driving mesh $M_D$. For example, consider a particular vertex in the source mesh identified by index value j and having position coordinates $x_{j,s}$, $y_{j,s}$, and $z_{j,s}$. This vertex has a counterpart vertex in the driving mesh identified by the same index value j and having position coordinates $x_{j,d}$, $y_{j,d}$ and $z_{j,d}$. The difference information for this particular index value is a triplet corresponding to $dx=x_{j,s}-x_{j,d}$, $dy=y_{j,s}-y_{j,d}$, and $dz=z_{j,s}-z_{j,d}$. The difference component 208 stores this triplet (dx, dy, dz) as a supplemental attribute value for the vertex j in the driving mesh $M_D$. A rendering component 210 then renders the driving mesh $M_D$ using a standard rendering pipeline, to produce the GDF information. Because the driving mesh $M_D$ serves as the bases for rendering the GDF information, the GDF information expresses the differences between the source mesh $M_S$ and the driving mesh $M_D$ from the "perspective" of the driving mesh $M_D$. Further note that the GDF information is an image that has three channels because the vertex-wise difference information has three respective components (e.g., dx, dy, dz).

The image-generating component 116 also generates three-channel reference face information, referred to herein as a normalized mean face coordinates (NMFC) image. The image-generating component 116 calculates the reference face information in the same way as the GDF information, but, in this case, the image-generating component 116 defines the attribute values added to the driving mesh as a normalized version of the face template $T_0$ in the zero pose $\theta_0$. More specifically, like the driving mesh $M_D$, the face template $T_0$ is also described by a matrix of N×3 vertices, with each entry in that matrix having coordinates x,y, and z. A normalization component 212 normalizes the coordinate values in $T_0$ to produce normalized coordinate values. For example, consider a particular x coordinate value of a particular vertex in $T_0$. In some implementations, the normalization component 212 normalizes this value x as: $x_{norm}=2\times(x-x_{min})/(x_{max}-x_{min})-1$. In this equation, $x_{max}$ and $x_{min}$ respectively refer to the maximum and minimum x values in the matrix $T_0$. This normalization operation effectively restricts all coordinate values to a range between $-1$ and $+1$, or, in other words, a 2×2×2 cube. The normalization component 212 adds the normalized coordinates as supplemental attribute values to the driving mesh $M_D$, and the rendering component 210 then uses the standard rendering pipeline to render the supplemented mesh $M_D$, to produce a three-channel NMFC image.

Figure 3:
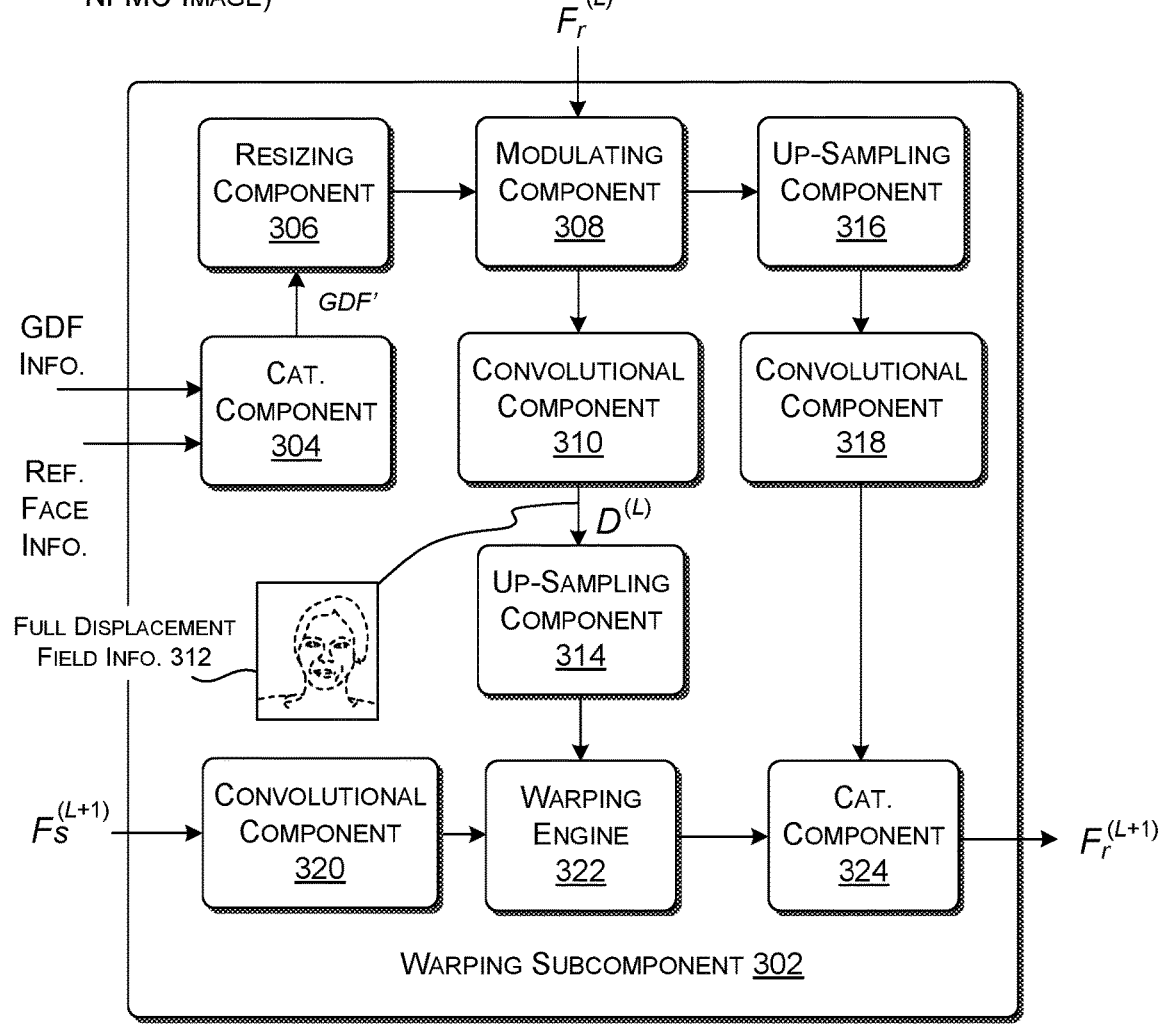
FIG. 3 shows a warping subcomponent, which is another part of the face-processing system of FIG. 1.

FIG. 3 shows one implementation of a warping subcomponent 302. Assume that the warping subcomponent 302 is located at level L+1 of the warping system 118. With the exception of the first warping subcomponent, the warping subcomponent 302 is preceded by another warping subcomponent (not shown) at level L. The warping subcomponent 302 at level L+1 operates at a higher resolution compared to the warping subcomponent at level L. With the exception of the last warping subcomponent, the warping subcomponent 302 is followed by another warping subcomponent (not shown) at level L+2 that operates at a higher resolution compared to the resolution of the warping subcomponent 302 at level L+1. In some implementations, all convolution operations described henceforth use a non-limiting kernel size of 3×3 and a non-limiting stride of 1.

A catenation component 304 concatenates the GDF information with the reference face information (both of which are generated by the image-generating component 116), to produce modified GDF information (GDF'). A resizing component 306 resizes the GDF information and the reference face information to an appropriate resolution for level L, if not already at this resolution. It is useful to combine the reference face information with the GDF information because the reference face information provides guidance in interpreting the GDF information.

A modulating component 308 uses the modified GDF information (GDF') to modulate the resampled feature information $F_r^{(L)}$ produced by the preceding warping subcomponent at level L. One implementation of the modulating component 308 will be described below with reference to FIGS. 4 and 5. A convolutional component 310 performs a convolution operation on the output information generated by the modulating component 308, to produce full displacement field information 312. The full displacement field information 312 is characterized as "full" because it extends the face-related difference information expressed by the modified GDF information (GDF') to peripheral non-face regions of the source image 106, such as regions that show hair, a hat, a shirt collar, etc. The warping subcomponent 302 is capable of making this extension by drawing from context information derived from the realigned feature information $F_r^{(L)}$ at level L. An up-sample component 314 increases the size (e.g., resolution) of the full displacement field information 312 generated by the convolutional component 310. In another processing branch, an up-sampling component 316 increases the size (e.g., resolution) of the output information generated by the modulating component 308. Another convolutional component 318 performs a convolution operation on the output information generated by the up-sampling component 316.

In the bottommost pipeline, a convolutional component 320 performs a convolution operation on the source feature information $F_s^{(L+1)}$ generated by a counterpart encoding subcomponent for level L+1. For example, assume that the warping subcomponent 302 corresponds to the particular warping subcomponent 136 shown in FIG. 1. In that case, the warping subcomponent 302 receives source feature information generated by the encoding subcomponent 126. A warping engine 322 realigns pixels in the source feature information $F_s^{(L+1)}$ to the target feature space based on the up-sampled full displacement field information 312 generated by the up-sampling component 314. Note that, while the full displacement field information 312 is generated based on machine-trained model weights, the mapping performed by the warping engine 322 is a non-learned geometrical displacement operation based on pixel-movement information specified in the full displacement field information 312. A concatenation component 324 concatenates the output of the warping engine 322 with the output of the convolutional component 318, to produce realigned feature information $F_r^{(L+1)}$ for level L+1.

Figure 4:
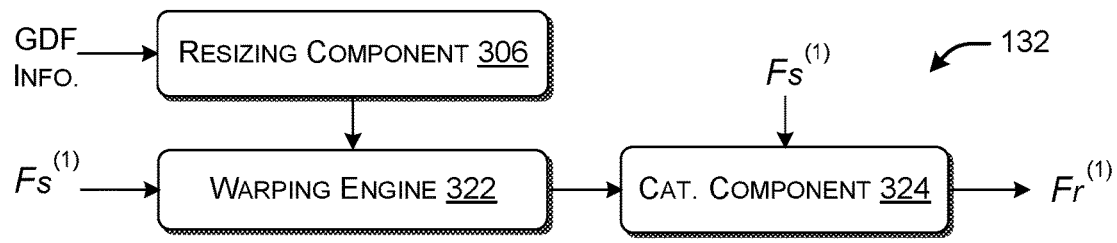
FIG. 4 shows a first warping subcomponent.

FIG. 4 shows the particular case of the first warping subcomponent 132 at level L=1, which does not have a preceding warping subcomponent. To address this special case, the warping subcomponent 132 can use the GDF information (GDF), resized by the resizing component 306, to warp the source feature information $F_s^{(1)}$ for level L=1, and then concatenate the output information generated by this warping operation with the same source feature information $F_s^{(1)}$. This yields realigned feature information $F_r^{(1)}$ for level L=1.

Figure 5:
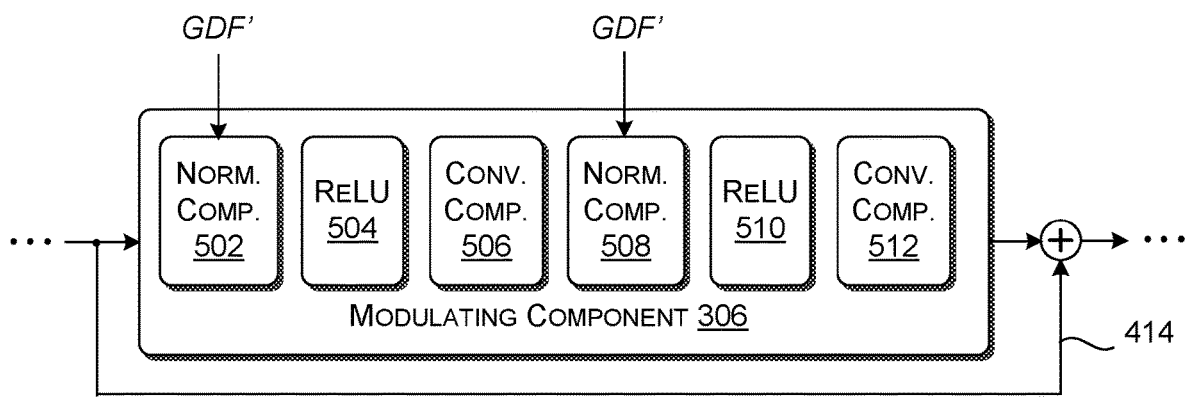
FIG. 5 shows a modulating component, which is one part of the warping subcomponent of FIG. 3.

FIG. 5 shows one non-limiting implementation of the modulating component 308 of FIG. 1. The modulating component 308 includes a pipeline of subcomponents including a first normalization component 502, a first ReLU component 504, a first convolutional component 506, a second normalization component 508, a second ReLU component 510, and a second convolutional component 512. The two convolutional components (506, 512) perform respective convolution operations on the two respective instances of input information fed to them. The two ReLU components (504, 510) apply the rectified linear unit (ReLU) activation function to the two respective instances of input information fed to them (e.g., wherein that function is given by $f(x)=(max, 0)$). Optionally, the modulating component 308 includes a residual connection 514 that adds the input information fed to the modulating component 308 to its output information. Optionally, the modulating component 308 includes two or more blocks of the subset of subcomponents shown in FIG. 5, operating in series.

Figure 6:
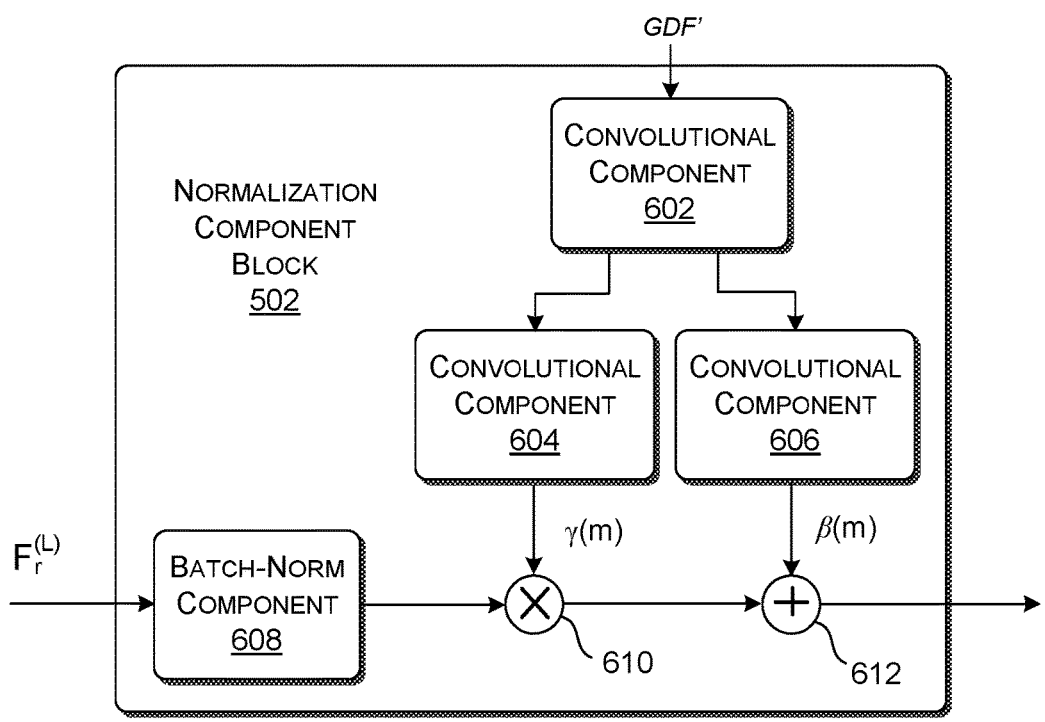
FIG. 6 shows a normalization component, which is one part of the modulating component of FIG. 5.

FIG. 6 shows one implementation of the first normalization component 502. Although not shown, the second normalization component 508 has the same logic as the first normalization component 502, but receives its input information from the first convolutional component 506. A first convolutional component 602 performs a convolution operation on the modified GDF information (GDF') provided by the resizing component 306 of FIG. 3. A second convolutional component 604 performs a convolution operation to map the output information generated by the first convolutional component 602 to first tensor information γ(GDF'). A third convolutional component 606 performs another convolution operation to map the output information generated by the first convolutional component 602 to second tensor information β(GDF').

A batch-normalization component 608 normalizes the resampled feature information $F_r^{(L)}$ based on the mean (μ) and standard deviation (σ) of image values in a batch of resampled feature information. That is, for a given element $F_{r,i}^{(L)}$, the batch-normalization component 608 generates normalized output information given by $(F_{r,i}^{(L)}-\mu)/\sigma$. A multiplication component 610 multiplies the output information generated by the batch-normalization component 608 by the first tensor information γ(GDF'). An addition component 612 adds the output information generated by the multiplication component 610 to the second tensor information β(GDF'), to yield the output information of the normalization component 502.

Other implementations can use other strategies to modulate the resampled feature information $F_r^{(L)}$ by the modified GDF information (GDF'). For instance, other implementations can perform this operation using a transformer-based neural network, a convolutional network, etc.

A.2. Illustrative Application Systems

Figures 7, 8:
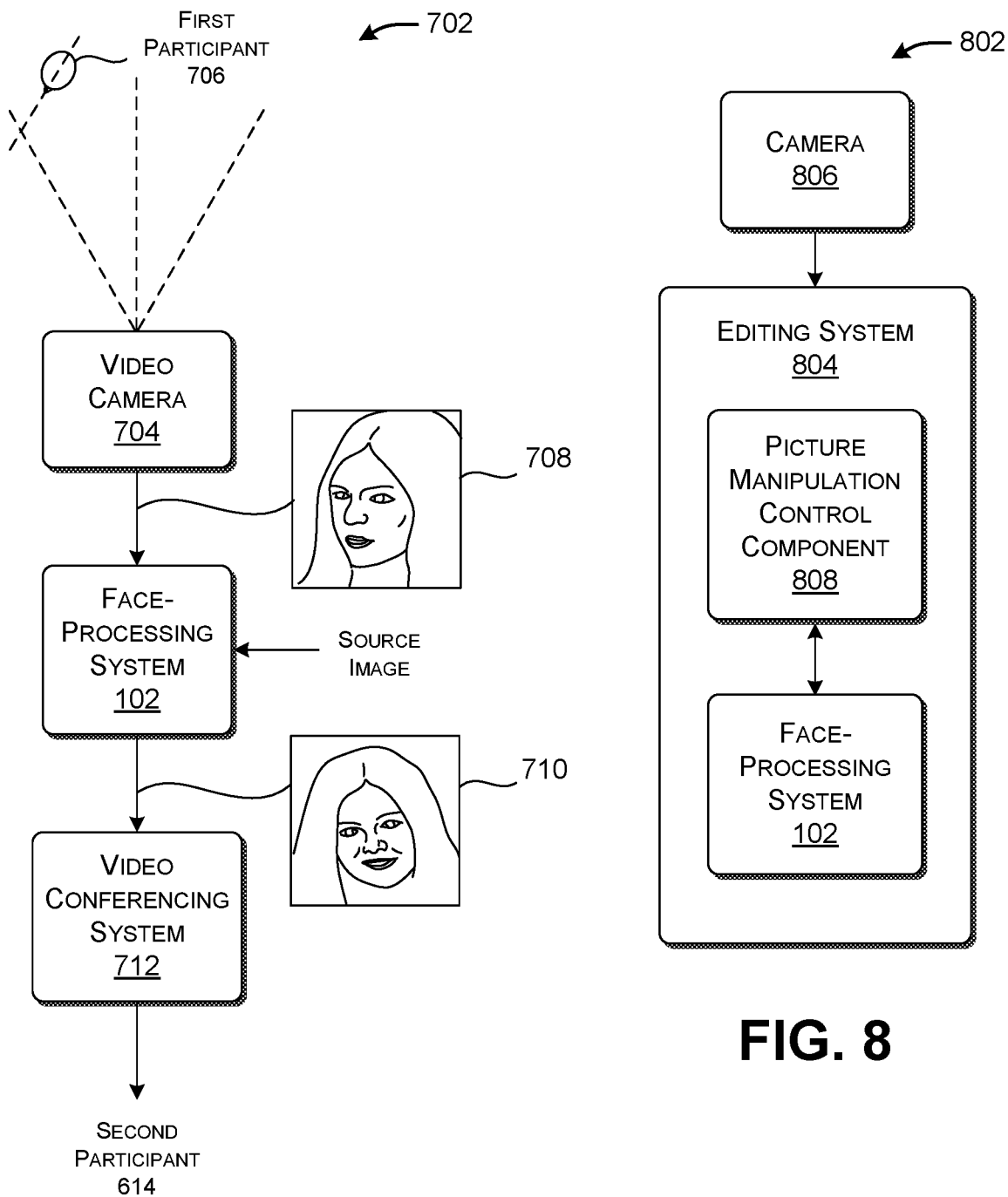
FIG. 7 shows a first application system that makes use of the face-processing system of FIG. 1.
FIG. 8 shows a second application system that makes use of the face-processing system of FIG. 1.

FIG. 7 shows an illustrative first application system 702 that makes use of the face-processing system 102. A video camera 704 captures video information of a first participant 706 of a videoconferencing session. Each frame of the video information constitutes a driving image. Further, assume that the first participant 706 has chosen a source image that depicts the first participant 706 in a state which he or she deems suitable for presentation to others. For instance, the first participant 706 may have selected a picture of himself or herself in a well-groomed condition, in professional attire, with a friendly expression, and looking directly at the camera. In contrast, the video camera 704 may capture video information that the first participant 706 may deem undesirable for one or more reasons. For instance, a video frame 708 captured by the video camera 704 may show the first participant 706 as informally dressed and/or disheveled. Alternatively, or in addition, the video frame 708 may show the first participant 706 looking off to the side, as opposed to giving his or her full attention to the video camera 704.

The face-processing system 102 produces synthesized video frames based on video frames captured by the video camera 704 (which constitute driving images) and the source image. As such, each synthesized video frame produced by the face-processing system 102 will exhibit the selected identity of the source image, yet exhibit the current pose and expression of the first participant 706, as expressed in each video frame. In the specific example of FIG. 7, the video frame 708 shows that the first participant 706 is looking off to the side, rather than giving full attention to the video camera 704. In contrast, the face-processing system 102 generates a synthesized video frame 710 that shows the first participant 706 as if she was looking directly at the video camera 704. This transformation is referred to as frontalization.

A videoconferencing system 712 delivers the synthesized video frames (including illustrative video frame 710) to a second participant 714. The synthesized video frames present a photorealistic depiction of the first participant 706 that is animated by the driving video frames actually captured by the video camera 704. Hence, the second participant 714 may be led to believe that the synthesized video frames are the original video frames captured by the video camera 704. In other cases, the first participant 706 selects a picture of another person or a fictional character instead of a picture of himself or herself. For example, the first participant 706 may choose to use the captured video frames to animate a stock photograph of a celebrity or other famous person, or to animate a fictional avatar.

Other implementations of the application system 702 can invoke the face-processing system 102 only when it detects that the first participant 706 is not looking directly at the video camera 704. A separate attention-detecting component (not shown) can use a machine-trained model to detect the orientation of the first participant 706 with respect to the optical axis of the video camera 706.

FIG. 8 shows an illustrative second application system 802 that makes use of the face-processing system 102 of FIG. 1. Here, an editing system 804 receives a still image or video information from a camera 806. The editing system 804 includes a picture manipulation control component ("control component" for brevity) 808 that allows a user to edit the still image or each frame of the video information. For example, the control component 808 can display a still image for the user's inspection together with graphical controls that allow the user to change different aspects of the still image, e.g., via graphical sliders, graphical knobs, parameter input fields, etc.

In this context, the still image constitutes a source image. The control signals generated by the user's interaction with the control component 808 constitute driving information, corresponding to a set of parameter values. For example, a first graphical control can allow the user to adjust the head pose shown in the source image. A second graphical control can allow the user to change the shape of a smile shown in the source image. A third graphical control can allow the user to adjust a degree to which eyes shown in the source image are open. A fourth graphical control can allow the user to adjust some aspect of the shape of a face in the source image, and so on. The face-processing system 102 generates a new driving mesh $M_D$ for each change in a graphical control. It then produces a synthesized image based on the difference between the source mesh $M_S$ and the driving mesh $M_D$. The editing system 804 produces these changes in real time, allowing the user to deform a face as he or she adjusts one or more graphical controls.

A.3. Illustrative Training System

Figure 9:
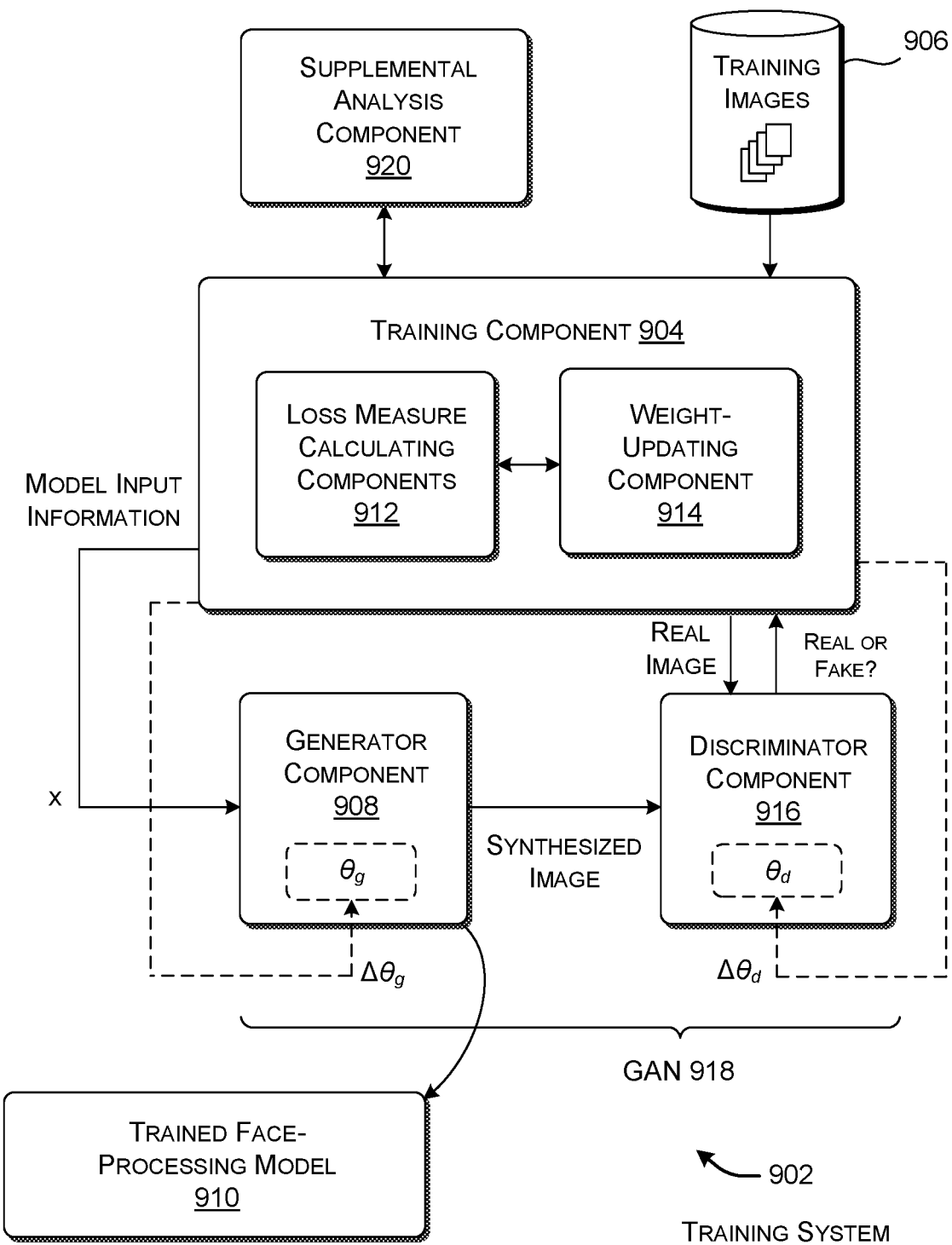
FIG. 9 shows a training system that trains a model that the face-processing system of FIG. 1 uses to perform its functions.

FIG. 9 shows a training system 902 that includes a training component 904 for iteratively performing a training operation based on training examples in a data store 906. A generator component 908 represents a machine-trained model in the course of its training. At any given time, the generator component 908 includes a set of machine-trained weights ($\theta_g$). A trained face-processing model 910 represents the generator component 908 after it has been fully trained. Generally, a model refers to a set of machine-trained weights that control the operation of a neural network. The face-processing system 102 (of FIG. 1) uses the face-processing model 910 to implement the warping system 118. In some implementations, the mesh-generating component 114 uses another model that is trained in advance in another training process (not shown). Here, the training system 902 shown in FIG. 9 uses the mesh-generating component 114 but does not modify the mesh-generating component's weights.

The training examples in the data store 906 include a plurality of pairs of images, each pair including a randomly selected source image and a randomly selected driving image. In some contexts, the source image and the driving image show the same person drawn from the same video clip. Here, the goal of the face-processing system 102 is to produce a synthesized image $I_{syn}$ that reconstructs the driving image, with respect to the source image and driving information extracted from the driving image. This means that the original driving image also constitutes a ground-truth image $I_{GT}$ with which the synthesized image $I_{syn}$ can be compared.

The training component 904 uses plural loss-calculating components 912 to calculate plural respective loss measures, examples of which are described below. The training component 904 also includes a weight-updating component 914 for adjusting the weights of the generator component 908 based on the loss measures produced by the loss-calculating components 912.

One of the loss-calculating components 912 relies on interaction between the generator component 908 and a discriminator component 916 in a generative adversarial network (GAN) 918. In some implementations, the discriminator component 916 is implemented as a convolutional neural network and is driven by a set of model weights $\theta_d$. The generator component 908 operates by transforming generator input information x into a synthesized image $I_{syn}$. The input information x represents the information fed to the warping subcomponents, including a source image, GDF information, and reference face information. The discriminator component 916 compares the synthesized image $I_{syn}$ with its ground-truth counterpart image $I_{GT}$ to determine the extent to which the synthesized image $I_{syn}$ resembles a "real" image. A "real" image refers to an original image that has not been synthesized.

As a first objective, the training component 904 attempts to iteratively adjust the weights of the generator component 908 such that it produces increasingly photorealistic synthetized images. A synthesized image $I_{syn}$ is deemed realistic when it successfully "fools" the discriminator component 916 into identifying it as real, when, in fact, it is synthetic. Second, the training component 904 attempts to iteratively adjust the weights of the discriminator component 916 to progressively increase the accuracy with which it assesses whether the discriminator input image is real or fake. Overall, the GAN 918 is said to be adversarial because the generator component 908 and the discriminator component 916 are pitted against each other; as each component improves its performance, it makes the function of the other component more difficult to perform.

The loss-calculating components 912 can calculate the loss ($\mathcal{L}_G$) of the generator component 908 and the loss ($\mathcal{L}_D$) discriminator component 916 based on using the following equations:

$$\mathcal{L}_G = -\sum_i \mathcal{D}_i(I_{syn} \mid C), \quad (3)$$

$$\mathcal{L}_D = -\sum_i [\min(0, -1 - \mathcal{D}_i(I_{syn} \mid C)) + \min(0, -1 + D_i(I_{GT} \mid C))]. \quad (4)$$

Equation (3) computes the loss for the generator component 908. $\mathcal{D}_i(I_{syn}|C)$ in that equation refers to a score generated by the discriminator component 916 for an image patch i of the synthesized image $I_{syn}$, given a conditional image C, which, in this case, corresponds to the reference face image (e.g., the NMFC image). A patch refers to an identified part of an image. Equation (3) generates a sum of similarly-computed scores over for all of the image patches that compose the synthesized $I_{syn}$. Equation (4) computes the loss for the discriminator component 916 using a hinge loss measure. It performs this task by calculating the sum of the minimum of (0 and $-1-\mathcal{D}_i(I_{syn}|C)$) and the minimum of (0 and $-1+\mathcal{D}_i(I_{GT}|C)$) for an image patch i. Equation (4) generates a sum of similarly-computed sums over all of the images patches that compose the two images.

The training component 904 supplements Equations (3) and (4) with other loss measures. For instance, the loss-calculating components 912 can calculate perceptual loss ($\mathcal{L}_P$) using the following equation:

$$\mathcal{L}_P(I_{syn}, I_{GT}) = \sum_s \sum_j \sum_i |v_{j,i}(I_{GT}^s) - v_{j,i}(I_{syn}^s)|. \quad (5)$$

The function $\mathcal{V}(\cdot)$ refers to a convolutional neural network (CNN) having plural layers that map an input image to feature information. For instance, the CNN can correspond to the VGG-19 network described in Simonyan, et al., "Very Deep Convolutional Networks for Large-Scale Image Recognition," in Cornell University's arXiv's library, arXiv: 1409.1556v6 [cs.CV], Apr. 10, 2015, 14 pages. In the context of FIG. 9, a supplement analysis component 920 implements the CNN.

More specifically, in Equation (5), an index s refers to one of plural image scales (e.g., 256×256, 128×128, 64×64, etc.). An index j refers to the j-th layer of the CNN. An index i refers to a spatial location within the layer j. $V_{i,j}(I_{GT}^s)$ refers to feature information generated by a convolution operation of CNN for the ground-truth image $I_{GT}^s$ for location i in layer j at scale s. $V_{i,j}(I_{syn}^s)$ refers to feature information generated by the convolution operation of the CNN for synthesized image $I_{syn}^s$ for location i in layer j at scale s. Equation (5) calculates the absolute difference of these two instances of feature information, and generates a sum of the differences across all locations, layers, and scales.

The loss-calculating component 912 can also generate a feature-matching loss ($\mathcal{L}_M$) given by the following equation:

$$\mathcal{L}_M = \sum_j \sum_i |\mathcal{D}_{j,i}(I_{GT}) - \mathcal{D}_{j,i}(I_{syn})|. \quad (6)$$

$\mathcal{D}_{j,i}(I_{GT})$ refers to the feature information generated by the discriminator component 916 for the ground-truth image $I_{GT}$ for spatial location i in level j of the discriminator component 916. $\mathcal{D}_{j,i}(I_{syn})$ refers to the feature information generated by the discriminator component 916 for the synthesized image $I_{syn}$ for the spatial location i in the level j of the discriminator component 916. Equation (6) calculates the absolute difference between these two instances of feature information, and then generates a sum of these differences across all locations and layers.

The loss-calculating components 912 can also compute a displacement consistency loss ($\mathcal{L}_C$) using Equation (7) that measures the consistency of the predicted full displacement field information D across different levels (l) having different respective resolutions, ranging from levels $L_{min}$ to L (where $L_{min}=L-3$ in one non-limiting case). The displacement field information D corresponds to the output of the convolutional component 310 in FIG. 3.

$$\mathcal{L}_C(D^{(L_{min})}, \ldots, D^{(L)}) = \sum_{l=L_{min}+1}^{L} \sum_i |\mathcal{R}_i(D^{(l)}) - D_i^{(L_{min})}|. \quad (7)$$

$\mathcal{R}_i(D^{(l)})$ refers to a resizing function that resizes the displacement field information at the resolution for level l to the resolution of the displacement field information at level $L_{min}$. Equation (7) generates the difference between the resized version of $D^{(l)}$ and $D^{(L_{min})}$ for each location i, and then generates the sum of these differences across all resolutions, from levels ($L_{min}$+1) to L.

In some implementations, the loss-calculating components 912 sum all the loss measures specified above to produce a global loss measure. The weight-updating component 914 then uses the global loss measure to update the weights of the generator components 912. The weight-updating component 914 also updates the discriminator component 916 using Equation (4). In other implementations, the training component 904 can interleave the use of different loss measures in different ways, e.g., by applying the perceptual loss ($\mathcal{L}_P$), feature-matching loss ($\mathcal{L}_M$), and displacement consistency loss ($\mathcal{L}_C$) in one training iteration, and then applying the adversarial losses ($\mathcal{L}_G$, $\mathcal{L}_D$) in a following training iteration. Still other implementations can use additional loss measures compared to those described above, and/or can omit one or more loss measures described above.

B. Illustrative Processes

FIGS. 10 and 11 show processes that explain the operation of the systems of Section A in flowchart form, according to some implementations. Since the principles underlying the operation of the systems have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In some implementations, the blocks shown in the flowcharts that pertain to processing-related functions are implemented by the hardware logic circuitry described in Section C, which, in turn, can be implemented by one or more hardware processors and/or other logic units that include a task-specific collection of logic gates.

FIG. 10 shows a process 1002 performed by the face-processing system 102 for transforming face information. In block 1004, the face-processing system 102 receives a source image 106 that includes data depicting at least a face of a source subject having a source identity, a source pose, and a source expression. In block 1006, the face-processing system 102 receives driving information 108 that specifies one or more driving characteristics. In block 1008, the face-processing system 102 produces a target image 104 that combines characteristics of the source image 106 and the driving information 108. In some cases, the driving information 108 describes a driving pose and/or a driving expression of a driving subject. The target image 104 shows the source subject having the source identity, and exhibits the driving pose and/or the driving expression. The driving subject may be the same as or different from the source subject.

The target image 104 is produced by performing plural instances of warping analysis at plural respective levels of a neural network, the plural instances of warping analysis operating at increasing respective resolutions. One of the plural instances, corresponding to a current instance of warping analysis, operates at a current-level resolution, and has a preceding instance of warping analysis that operates at a prior-level resolution that is less that the current-level resolution.

FIG. 11 shows a process 1102 performed by the warping subcomponent 302 of FIG. 3. In block 1104, the warping subcomponent 302 receives geometric displacement field (GDF) information that describes differences between a source mesh generated based on the source image 106 and a driving mesh generated based on the driving information 108. In block 1106, the warping subcomponent 302 receives current-level source feature information produced based on the source image 106, at the current-level resolution. In block 1108, the warping subcomponent 302 receives prior-level realigned feature information that has been produced by the preceding instance of warping analysis, at the prior-level resolution. In block 1110, the warping subcomponent 302 maps the GDF information, current-level source feature information, and prior-level realigned feature information to current-level realigned feature information, at the current-level resolution.

C. Representative Computing Functionality

FIG. 12 shows an example of computing equipment that can be used to implement any of the systems summarized above. The computing equipment includes a set of user computing devices 1202 coupled to a set of servers 1204 via a computer network 1206. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1206 can be implemented as a local area network, a wide area network (e.g., the Internet), one or more point-to-point links, or any combination thereof.

FIG. 12 also indicates that face-processing system 102, the application systems (702, 802), and the training system 902 can be spread across the user computing devices 1202 and/or the servers 1204 in any manner. For instance, in some cases, the face-processing system 102 is entirely implemented by one or more of the servers 1204. Each user may interact with the servers 1204 via a user computing device. In other cases, the face-processing system 102 is entirely implemented by a user computing device in local fashion, in which case no interaction with the servers 1204 is necessary. In another case, the functionality associated with the face-processing system 102 is distributed between the servers 1204 and each user computing device in any manner.

Figure 13:
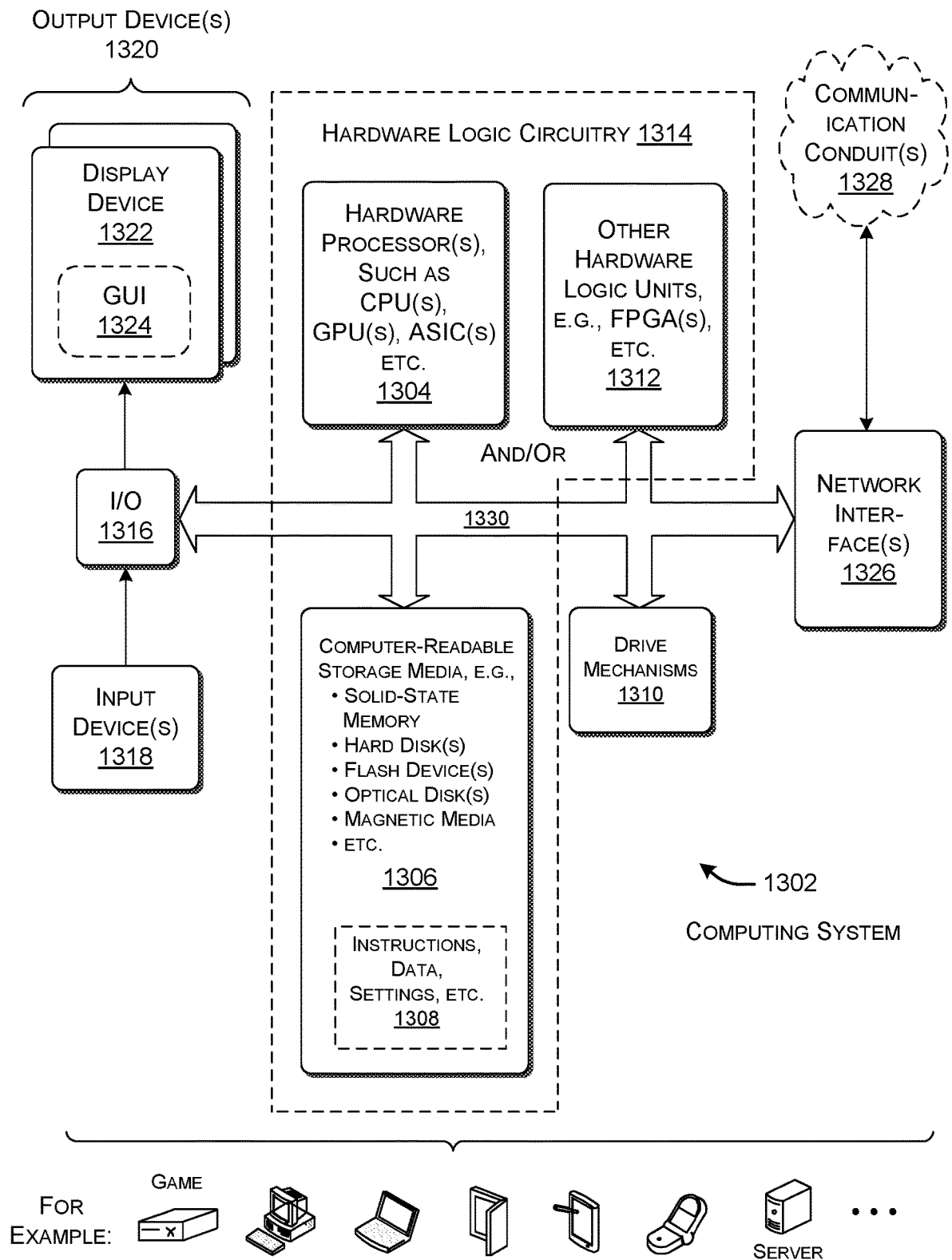
FIG. 13 shows an illustrative type of computing system that can be used to implement any aspect of the features shown in the foregoing drawings.

FIG. 13 shows a computing system 1302 that can be used to implement any aspect of the mechanisms set forth in the above-described figures. For instance, the type of computing system 1302 shown in FIG. 13 can be used to implement any user computing device or any server shown in FIG. 12. In all cases, the computing system 1302 represents a physical and tangible processing mechanism.

The computing system 1302 can include one or more hardware processors 1304. The hardware processor(s) 1304 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1302 can also include computer-readable storage media 1306, corresponding to one or more computer-readable media hardware units. The computer-readable storage media 1306 retains any kind of information 1308, such as machine-readable instructions, settings, data, etc. Without limitation, the computer-readable storage media 1306 can include one or more solid-state devices, one or more magnetic hard disks, one or more optical disks, magnetic tape, and so on. Any instance of the computer-readable storage media 1306 can use any technology for storing and retrieving information. Further, any instance of the computer-readable storage media 1306 can represent a fixed or removable unit of the computing system 1302. Further, any instance of the computer-readable storage media 1306 can provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1302 can utilize any instance of the computer-readable storage media 1306 in different ways. For example, any instance of the computer-readable storage media 1306 may represent a hardware memory unit (such as Random Access Memory (RAM)) for storing information during execution of a program by the computing system 1302, and/or a hardware storage unit (such as a hard disk) for retaining/archiving information on a more permanent basis. In the latter case, the computing system 1302 also includes one or more drive mechanisms 1310 (such as a hard drive mechanism) for storing and retrieving information from an instance of the computer-readable storage media 1306.

The computing system 1302 can perform any of the functions described above when the hardware processor(s) 1304 carry out computer-readable instructions stored in any instance of the computer-readable storage media 1306. For instance, the computing system 1302 can carry out computer-readable instructions to perform each block of the processes described in Section B.

Alternatively, or in addition, the computing system 1302 can rely on one or more other hardware logic units 1312 to perform operations using a task-specific collection of logic gates. For instance, the hardware logic unit(s) 1312 can include a fixed configuration of hardware logic gates, e.g., that are created and set at the time of manufacture, and thereafter unalterable. Alternatively, or in addition, the other hardware logic unit(s) 1312 can include a collection of programmable hardware logic gates that can be set to perform different application-specific tasks. The latter class of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 13 generally indicates that hardware logic circuitry 1314 includes any combination of the hardware processor(s) 1304, the computer-readable storage media 1306, and/or the other hardware logic unit(s) 1312. That is, the computing system 1302 can employ any combination of the hardware processor(s) 1304 that execute machine-readable instructions provided in the computer-readable storage media 1306, and/or one or more other hardware logic unit(s) 1312 that perform operations using a fixed and/or programmable collection of hardware logic gates. More generally stated, the hardware logic circuitry 1314 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1314 that performs a particular function or combination of functions.

In some cases (e.g., in the case in which the computing system 1302 represents a user computing device), the computing system 1302 also includes an input/output interface 1316 for receiving various inputs (via input devices 1318), and for providing various outputs (via output devices 1320). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism can include a display device 1322 and an associated graphical user interface presentation (GUI) 1324. The display device 1322 can correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1302 can also include one or more network interfaces 1326 for exchanging data with other devices via one or more communication conduits 1328. One or more communication buses 1330 communicatively couple the above-described units together.

The communication conduit(s) 1328 can be implemented in any manner, e.g., by a local area computer network, a wide area computer network (e.g., the Internet), point-to-point connections, etc., or any combination thereof. The communication conduit(s) 1328 can include any combination of hardwired links, wireless links, routers, gateway functionality, name servers, etc., governed by any protocol or combination of protocols.

FIG. 13 shows the computing system 1302 as being composed of a discrete collection of separate units. In some cases, the collection of units corresponds to discrete hardware units provided in a computing device chassis having any form factor. FIG. 13 shows illustrative form factors in its bottom portion. In other cases, the computing system 1302 can include a hardware logic unit that integrates the functions of two or more of the units shown in FIG. 1. For instance, the computing system 1302 can include a system on a chip (SoC or SOC), corresponding to an integrated circuit that combines the functions of two or more of the units shown in FIG. 13.

The following summary provides a non-exhaustive set of illustrative examples of the technology set forth herein.

(A1) According to a first aspect, some implementations of the technology described herein include a method (e.g., the processes 1002, 1102) for transforming face information. The method includes: receiving (e.g., in block 1004) a source image (e.g., 106) that includes data depicting at least a face of a source subject having a source identity, a source pose, and a source expression; receiving (e.g., in block 1006) driving information (e.g., 108) that specifies one or more driving characteristics; and producing (e.g., 1008) a target image (e.g., 104) that combines characteristics of the source image and the driving information. The target image is produced by performing plural instances of warping analysis at plural respective levels of a neural network, the plural instances of warping analysis operating at increasing respective resolutions. One of the plural instances, corresponding to a current instance of warping analysis, operates at a current-level resolution, and has a preceding instance of warping analysis that operates at a prior-level resolution that is less that the current-level resolution.

The current instance of warping analysis includes operations of: receiving (e.g., in block 1104) geometric displacement field (GDF) information that describes differences between a source mesh generated based on the source image and a driving mesh generated based on the driving information; receiving (e.g., in block 1106) current-level source feature information produced based on the source image, at the current-level resolution; receiving (e.g., in block 1108) prior-level realigned feature information that has been produced by the preceding instance of warping analysis, at the prior-level resolution; and mapping (e.g., in block 1110) the GDF information, current-level source feature information, and prior-level realigned feature information to current-level realigned feature information, at the current-level resolution. The method of A1 reduces artifacts in the target image, and uses a compact design that can be deployed on resource-constrained computing platforms.

(A2) According to some implementations of the method of A1, the driving information describes a driving pose and/or a driving expression of a driving subject. The target image shows the source subject having the source identity, and exhibiting the driving pose and/or the driving expression.

(A3) According to some implementations of the method of A2, the driving subject is the same as source subject.

(A4) According to some implementations of the method of A2, the driving subject is different than the source subject.

(A5) According to some implementations of any of the methods of A1-A4, the driving information is received in a form of a driving image.

(A6) According to some implementations of any of the methods of A1-A4, the driving information is received in a form of driving parameter information.

(A7) According to some implementations of any of the methods of A1-A6, the GDF information is generated by: mapping the source image to the source mesh using a geometric face model; mapping the driving information to a driving mesh using the geometric face model; and forming a difference between the source mesh and the driving mesh, to produce the GDF information.

(A8) According to some implementations of the method of A7, the operation of mapping the source image to the source mesh includes: mapping the source image to a set of model parameters; and using the geometric face model to generate the source mesh based on the set of model parameters.

(A9) According to some implementations of any of the methods of A1-A8, the current-level source feature information received by the current instance of warping analysis is produced by a convolution operation that operates on the source image, and wherein the convolution operation operates at the current-level resolution.

(A10) According to some implementations of any of the methods of A1-A9, the method further includes combining the GDF information with reference face information that is derived from the driving information, to produced modified GDF information.

(A11) According to some implementations of any of the methods of A1-A10, the method further includes, at the current level of warping analysis, using the GDF information to modulate the prior-level realigned feature information, to produce full displacement field information. The full displacement field information is used to generate the current-level realigned feature information.

(A12) According to some implementations of the method of A11, a first instance of warping analysis, having no preceding instance of warping analysis, bypasses modulation of prior-level realigned source information.

(A13) According to some implementations of any of the methods of A1-A12, the driving information is a driving image obtained from a video camera, the driving image showing a video conference participant. The source image is an image selected by the video conference participant. The target image is sent to another video conference participant, in place of the driving image captured by the video camera.

(B1) According a second aspect, some implementations of the technology described herein include a method (e.g., the processes 1002, 1102) for transforming face information. The method includes: receiving (e.g., in block 1004) a source image (e.g., 106) that includes data depicting at least a face of a source subject having a source identity, a source pose, and a source expression; receiving (e.g., in block 1006) driving information (e.g., 108) that specifies one or more driving characteristics; receiving (e.g., in block 1104) geometric displacement field (GDF) information that describes differences between a source mesh generated based on the source image and a driving mesh generated based on the driving information; and producing (e.g., in block 1008) a target image (e.g., 104) that combines characteristics of the source image and the driving information. The target image is produced by performing plural instances of warping analysis at plural respective levels, the plural instances of warping analysis operating at increasing respective resolutions. Each particular instance of warping analysis having a preceding instance of warping analysis uses the GDF information to modulate feature information produced by a preceding instance of warping analysis, to produce full displacement field information, and uses the full displacement field information to generate realigned feature information for the particular instance of warping analysis.

In yet another aspect, some implementations of the technology described herein include a computing system (e.g., computing system 1302). The computing system includes hardware logic circuitry (e.g., 1314) that is configured to perform any of the methods described herein (e.g., any of the methods of A1-A13 or B1). In some implementations, the hardware logic circuitry implements a neural network having plural layers that perform the plural respective instances of warping analysis at increasing respective resolutions.

In yet another aspect, some implementations of the technology described herein include a computer-readable storage medium (e.g., the computer-readable storage media 1306) for storing computer-readable instructions (e.g., 1308). One or more hardware processors (e.g., 1304) execute the computer-readable instructions to perform any of the methods described herein (e.g., any of the methods of A1-A13 or B1).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1314 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional," or may have used other language to indicate that one or more feature may be used in some implementations, but not other implementations. This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for transforming face information, comprising:
receiving a source image that includes data depicting at least a face of a source subject having a source identity, a source pose, and a source expression;

receiving driving information that specifies one or more driving characteristics; and producing a target image that combines characteristics of the source image and the driving information, the target image being produced by performing plural instances of warping analysis at plural respective levels of a neural network, the plural instances of warping analysis operating at increasing respective resolutions, one of the plural instances, corresponding to a current instance of warping analysis, operating at a current-level resolution, and having a preceding instance of warping analysis that operates at a prior-level resolution that is less that the current-level resolution, the current instance of warping analysis including operations of:

receiving geometric displacement field (GDF) information that describes differences between a source mesh generated based on the source image and a driving mesh generated based on the driving information;

receiving current-level source feature information produced based on the source image, at the current-level resolution;

receiving prior-level realigned feature information that has been produced by the preceding instance of warping analysis, at the prior-level resolution; and mapping the GDF information, current-level source feature information, and prior-level realigned feature information to current-level realigned feature information, at the current-level resolution.

2. The computer-implemented method of claim 1,
wherein the driving information describes a driving pose and/or a driving expression of a driving subject, and
wherein the target image shows the source subject having the source identity, and exhibiting the driving pose and/or the driving expression.

3. The computer-implemented method of claim 2, wherein the driving subject is the same as the source subject.

4. The computer-implemented method of claim 2, wherein the driving subject is different than the source subject.

5. The computer-implemented method of claim 1, wherein the driving information is received in a form of a driving image.

6. The computer-implemented method of claim 1, wherein the driving information is received in a form of driving parameter information.

7. The computer-implemented method of claim 1, wherein the GDF information is generated by:
mapping the source image to the source mesh using a geometric face model;
mapping the driving information to a driving mesh using the geometric face model; and
forming a difference between the source mesh and the driving mesh, to produce the GDF information.

8. The computer-implemented method of claim 7, wherein said mapping of the source image to the source mesh includes:
mapping the source image to a set of model parameters; and
using the geometric face model to generate the source mesh based on the set of model parameters.

9. The computer-implemented method of claim 1, wherein the current-level source feature information received by the current instance of warping analysis is produced by a convolution operation that operates on the source image, and wherein the convolution operation operates at the current-level resolution.

10. The computer-implemented method of claim 1, further comprising combining the GDF information with reference face information that is derived from the driving information, to produced modified GDF information.

11. The computer-implemented method of claim 1, further comprising, at the current level of warping analysis, using the GDF information to modulate the prior-level realigned feature information, to produce full displacement field information, and wherein the full displacement field information is used to generate the current-level realigned feature information.

12. The computer-implemented method of claim 11, wherein a first instance of warping analysis, having no preceding instance of warping analysis, bypasses modulation of prior-level realigned source information.

13. The computer-implemented method of claim 1,
wherein the driving information is a driving image obtained from a video camera, the driving image showing a video conference participant,
wherein the source image is an image selected by the video conference participant, and
wherein the target image is sent to another video conference participant, in place of the driving image captured by the video camera.

14. A computing system, comprising:
a neural network implemented by hardware logic circuitry, the neural network having plural layers that perform plural respective instances of warping analysis at increasing respective resolutions, to generate a target image,
one of the plural instances, corresponding to a current instance of warping analysis, operating at a current-level resolution, and having a preceding instance of warping analysis that operates at a prior-level resolution that is less that the current-level resolution,
the current instance of warping analysis including operations of:
receiving geometric displacement field (GDF) information that describes differences between a source mesh generated based on a source image and a driving mesh generated based on driving information;
receiving current-level source feature information produced based on the source image, at the current-level resolution;
receiving prior-level realigned feature information that has been produced by the preceding instance of warping analysis, at the prior-level resolution; and
mapping the GDF information, current-level source feature information, and prior-level realigned feature information to current-level realigned feature information, at the current-level resolution,
the source image including data depicting at least a face of a source subject having a source identity, a source pose, and a source expression,
the driving information specifying one or more driving characteristics, and
the target image combining characteristics of the source image and the driving information.

15. The computing system of claim 14,
wherein the driving information describes a driving pose and/or a driving expression of a driving subject, and
wherein the target image shows the source subject having the source identity, and exhibiting the driving pose and/or the driving expression.

16. The computing system of claim 14, wherein the GDF information is produced by:
- mapping the source image to the source mesh using a geometric face model;
- mapping the driving information to a driving mesh using the geometric face model; and
- forming a difference between the source and the driving mesh, to produce the GDF information.

17. The computing system of claim 14, wherein the current-level source feature information received by the current instance of warping analysis is produced by a convolution operation that operates on the source image, the convolution operation operating at the current-level resolution.

18. The computing system of claim 14, wherein the operations further include, at the current level of warping analysis, using the GDF information to modulate the prior-level realigned feature information, to produce full displacement field information, and wherein the full displacement field information is used to generate the current-level realigned feature information.

19. A computer-readable storage medium for storing computer-readable instructions, the computer-readable storage medium excluding propagated signals in transit, one or more hardware processors executing the computer-readable instructions to perform a method that comprises:
- receiving a source image that includes data depicting at least a face of a source subject having a source identity, a source pose, and a source expression;
- receiving driving information that specifies one or more driving characteristics;
- receiving geometric displacement field (GDF) information that describes differences between a source mesh generated based on the source image and a driving mesh generated based on the driving information;
- producing a target image that combines characteristics of the source image and the driving information,
- the target image being produced by performing plural instances of warping analysis at plural respective levels, the plural instances of warping analysis operating at increasing respective resolutions,
- each particular instance of warping analysis having a preceding instance of warping analysis using the GDF information to modulate feature information produced by a preceding instance of warping analysis, to produce full displacement field information, and using the full displacement field information to generate realigned feature information for the particular instance of warping analysis.

20. The computer-readable storage medium of claim 19, which excludes propagated signals in transit,
- wherein the driving information describes a driving pose and/or a driving expression of a driving subject, and
- wherein the target image shows the source subject having the source identity, and exhibiting the driving pose and/or the driving expression.

* * * * *